United States Patent
Solhusvik et al.

(10) Patent No.: US 9,161,028 B2
(45) Date of Patent: Oct. 13, 2015

(54) IMAGE SENSORS WITH DARK PIXELS FOR REAL-TIME VERIFICATION OF IMAGING SYSTEMS

(71) Applicant: Semiconductor Components Industries, LLC, Phoenix, AZ (US)

(72) Inventors: Johannes Solhusvik, Haslum (NO); Neal Crook, Rading (GB)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 14/279,097

(22) Filed: May 15, 2014

(65) Prior Publication Data
US 2014/0247366 A1    Sep. 4, 2014

Related U.S. Application Data

(62) Division of application No. 13/399,912, filed on Feb. 17, 2012, now Pat. No. 8,730,330.

(60) Provisional application No. 61/511,480, filed on Jul. 25, 2011, provisional application No. 61/511,472, filed on Jul. 25, 2011.

(51) Int. Cl.
    *H04N 17/00*    (2006.01)
    *H04N 5/3745*    (2011.01)
    *H04N 5/335*    (2011.01)

(52) U.S. Cl.
    CPC ............. *H04N 17/002* (2013.01); *H04N 5/335* (2013.01); *H04N 5/37452* (2013.01)

(58) Field of Classification Search
    CPC ....... H04N 5/357; H04N 5/361; H04N 5/369; H04N 5/3696; H04N 5/36963; H04N 17/002; H04N 5/37452; H04N 5/335
    USPC ......... 348/187, 302, 243, 308, 175, 177, 180, 348/222, 241, 246, 251
    See application file for complete search history.

(56) References Cited

U.S. PATENT DOCUMENTS

| | | | |
|---|---|---|---|
| 6,388,245 | B1 | 5/2002 | Lee |
| 6,577,748 | B2 | 6/2003 | Chang |

(Continued)

FOREIGN PATENT DOCUMENTS

| | | |
|---|---|---|
| EP | 1881692 | 1/2008 |
| WO | 2008036289 | 3/2008 |

*Primary Examiner* — Nhan T Tran
*Assistant Examiner* — Chan Nguyen
(74) *Attorney, Agent, or Firm* — Treyz Law Group; Kendall P. Woodruff

(57) ABSTRACT

An imaging system may include an array of image pixels. The array of image pixels may be provided with one or more rows and columns of optically shielded dark image pixels. The dark image pixels may be used to produce verification image data that follows the same pixel-to-output data path of light-receiving pixels. The output signals from dark pixels may be continuously or intermittently compared with a set of expected output signals to verify that the imaging system is functioning properly. In some arrangements, verification image data may include a current frame number that is encoded into the dark pixels. The encoded current frame number may be compared with an expected current frame number. In other arrangements, dark pixels may be configured to have a predetermined pattern of conversion gain levels. The output signals may be compared with a "golden" image or other predetermined set of expected output signals.

17 Claims, 9 Drawing Sheets

(56) References Cited

U.S. PATENT DOCUMENTS

| | | |
|---|---|---|
| 7,141,774 B2 | 11/2006 | Yuyama |
| 7,747,087 B2 | 6/2010 | Laude et al. |
| 7,791,664 B1 | 9/2010 | Koifman |
| 2006/0061529 A1 | 3/2006 | Kim |
| 2008/0169414 A1 | 7/2008 | Li |
| 2008/0197268 A1* | 8/2008 | Kameda ............... 250/208.1 |
| 2008/0225144 A1 | 9/2008 | Mauritzson |
| 2008/0303905 A1* | 12/2008 | Chinnaveerappan ......... 348/187 |
| 2010/0026783 A1 | 2/2010 | Chiu et al. |
| 2010/0097511 A1 | 4/2010 | Adkisson et al. |
| 2010/0283875 A1 | 11/2010 | Naskali et al. |
| 2012/0256077 A1* | 10/2012 | Yen et al. ............... 250/208.1 |
| 2013/0048831 A1* | 2/2013 | Bikumandla ............. 250/208.1 |

\* cited by examiner

IMAGE SENSORS WITH DARK PIXELS FOR REAL-TIME VERIFICATION OF IMAGING SYSTEMS

This application is a division of patent application Ser. No. 13/399,912, filed Feb. 17, 2012, which claims the benefit of provisional patent application No. 61/511,480, filed Jul. 25, 2011, and of provisional patent application No. 61/511,472, filed on Jul. 25, 2011, which are hereby incorporated by reference herein in their entireties. This application claims the benefit of and claims priority to patent application Ser. No. 13/399,912, filed Feb. 17, 2012, provisional patent application No. 61/511,480, filed Jul. 25, 2011, and provisional patent application No. 61/511,472, filed on Jul. 25, 2011.

BACKGROUND

This relates generally to imaging systems and, more particularly, to imaging systems that use dark pixels to test the integrity of the imaging system.

Modern electronic devices such as cellular telephones, cameras, and computers often use digital image sensors. Imagers (i.e., image sensors) may be formed from a two-dimensional array of image sensing pixels. Each pixel receives incident photons (light) and converts the photons into electrical signals. Image sensors are sometimes designed to provide images to electronic devices using a Joint Photographic Experts Group (JPEG) format.

Over the lifetime of an electronic device, image sensors in the electronic device may be prone to failure. Conventional image sensors are sometimes provided with methods for testing the functionality of the image sensor when the electronic device is in stand-by mode. However, failure or error may occur during active operation of the electronic device or may otherwise be undetectable during stand-by mode.

It would therefore be desirable to provide improved imaging systems with capabilities to verify the functionality of the imaging system during active operation.

DETAILED DESCRIPTION

Figure 1:
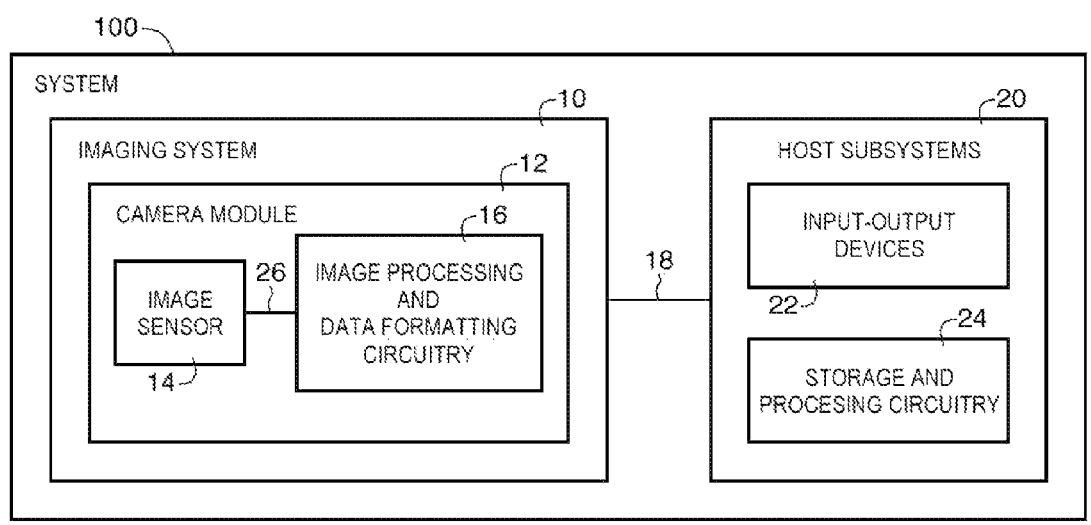
FIG. 1 is a diagram of an illustrative system that includes an imaging system and a host subsystem in accordance with an embodiment of the present invention.

Imaging systems having digital camera modules are widely used in electronic devices such as digital cameras, computers, cellular telephones, and other electronic devices. A digital camera module may include one or more image sensors that gather incoming light to capture an image.

In some situations, imaging systems may form a portion of a larger system such as a surveillance system or a safety system for a vehicle (e.g., an automobile, a bus, or any other vehicle). In a vehicle safety system, images captured by the imaging system may be used by the vehicle safety system to determine environmental conditions surrounding the vehicle. As examples, vehicle safety systems may include systems such as a parking assistance system, an automatic or semi-automatic cruise control system, an auto-braking system, a collision avoidance system, a lane keeping system (sometimes referred to as a lane drift avoidance system), etc. In at least some instances, an imaging system may form part of a semi-autonomous or autonomous self-driving vehicle. Such imaging systems may capture images and detect nearby vehicles using those images. If a nearby vehicle is detected in an image, the vehicle safety system may sometimes operate a warning light, a warning alarm, or may activate braking, active steering, or other active collision avoidance measures. A vehicle safety system may use continuously captured images from an imaging system having a digital camera module to help avoid collisions with objects (e.g., other automobiles or other environmental objects), to help avoid unintended drifting (e.g., crossing lane markers) or to otherwise assist in the safe operation of a vehicle during any normal operation mode of the vehicle.

Vehicle safety standards may require that the proper operation of any component of a vehicle safety system (including imaging system components) be verified before, during, and/or after operation of the vehicle. Verification operations for imaging system components may be performed by an imaging system prior to and/or after operation of a vehicle (e.g., upon startup and/or shutdown of the imaging system). In these verification operations, concurrent operation of the imaging system may not be required. However, it may be desirable to continuously monitor the status of imaging system components during operation of the imaging system, particularly in situations in which vehicle safety may be influenced by the quality of imaging data provided by the imaging system. Imaging systems may be provided having this type of on-the-fly (e.g., real-time) verification capability.

Image sensors may include arrays of image pixels. The pixels in the image sensors may include photosensitive elements such as photodiodes that convert the incoming light into electric charge. Image sensors may have any number of pixels (e.g., hundreds or thousands or more). A typical image sensor may, for example, have hundreds, thousands, or millions of pixels (e.g., megapixels). An image sensor may include verification circuitry for verifying the correct operation of the image sensor. For example, in situations in which images captured by the image sensors are used as input to an active control system for a vehicle, verification circuitry in the image sensor may be configured to generate verification image data and compare the verification image data with an expected result so that incorrect image sensor data is not input into the active control system.

In some configurations, verification image data may be compared with a predetermined standard stored in the imaging system, generated by the imaging system during operation, or stored on additional circuitry that is external to the imaging system. The predetermined standard may be a mathematically determined threshold, may sometimes be referred to as a "golden" standard image, may be captured during manufacturing of the imaging system or at another suitable time (e.g., during startup or shutdown of the imaging system), and may include one or more mathematically or experimentally determined ranges to which verification image data may be compared.

In other configurations, verification image data may include a pattern or sequence of data values. The pattern or sequence of data values from the verification image data may be compared with a predetermined pattern or sequence of data values. For example, verification image data may include a frame number that has been digitally encoded into the image. The verification image data may be compared with a known frame number to verify that the frame number encoded into the image matches the known frame number. Other patterns or sequences of data values may be encoded into the image data to be used as verification image data. Digitally encoding the frame count into the image data is sometimes described herein as an example.

Based on the result of the comparison of the verification image data with the predetermined standard or predetermined pattern, an imaging system may be disabled (e.g., if the result is outside the predetermined range or if the result does not match the known frame number) or may continue to operate normally (e.g., if the result is within the predetermined range or if the result matches the known frame number). In some arrangements, the imaging system may remain in operation but an indicator may be presented to users to inform the users that the imaging system needs further inspection and/or repair (e.g., the imaging system may present a "check imaging system" indication when the results of verification operations indicate a potential problem in the operation of the imaging system).

FIG. 1 is a diagram of an illustrative imaging and response system including an imaging system that uses an image sensor to capture images. System 100 of FIG. 1 may be a vehicle safety system (e.g., an active braking system or other vehicle safety system), may be a surveillance system, or may be an electronic device such as a camera, a cellular telephone, a video camera, or other electronic device that captures digital image data.

As shown in FIG. 1, system 100 may include an imaging system such as imaging system 10 and host subsystems such as host subsystem 20. Imaging system 10 may include camera module 12. Camera module 12 may include one or more image sensors 14 and one or more lenses. The lenses in camera module 12 may, as an example, include M*N individual lenses arranged in an M×N array. Individual image sensors 14 may be arranged in a corresponding M×N image sensor array (as an example). The values of M and N may each be equal to or greater than one, may each be equal to or greater than two, may exceed 10, or may have any other suitable values.

Each image sensor in camera module 12 may be identical or there may be different types of image sensors in a given image sensor array integrated circuit. Each image sensor may be a Video Graphics Array (VGA) sensor with a resolution of 480×640 image sensor pixels (as an example). Other arrangements of image sensor pixels may also be used for the image sensors if desired. For example, images sensors with greater than VGA resolution (e.g., high-definition image sensors), less than VGA resolution and/or image sensor arrays in which the image sensors are not all identical may be used.

During image capture operations, each lens may focus light onto an associated image sensor 14. Image sensor 14 may include photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from camera sensor 14 may be provided to image processing and data formatting circuitry 16 via path 26. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common semiconductor substrate (e.g., a common silicon image sensor integrated circuit die). If desired, camera sensor 14 and image processing circuitry 16 may be formed on separate semiconductor substrates. For example, camera sensor 14 and image processing circuitry 16 may be formed on separate substrates that have been stacked.

Imaging system 10 (e.g., image processing and data formatting circuitry 16) may convey acquired image data to host subsystem 20 over path 18. Host subsystem 20 may include an active control system that delivers control signals for controlling vehicle functions such as braking or steering to external devices. Host subsystem 20 may include processing software for detecting objects in images, detecting motion of objects between image frames, determining distances to objects in images, filtering or otherwise processing images provided by imaging system 10. Host subsystem 20 may include a warning system configured to disable imaging system 10 and/or generate a warning (e.g., a warning light on an automobile dashboard, an audible warning or other warning) in the event that verification image data associated with an image sensor indicates that the image sensor is not functioning properly.

If desired, system 100 may provide a user with numerous high-level functions. In a computer or advanced cellular telephone, for example, a user may be provided with the ability to run user applications. To implement these functions, host subsystem 20 of system 100 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc.

During operation of imaging system 10, camera module 12 may continuously capture and provide image frames to host subsystem 20. During image capture operations, verification circuitry associated with image sensor 14 may be occasionally operated (e.g., following each image frame capture, following every other image frame capture, following every fifth image frame capture, during a portion of an image frame capture, etc.). Images captured when verification circuitry is operated may include verification image data containing verification information. Verification image data may be provided to image processing circuitry 16 and/or storage and processing circuitry 24. Image processing circuitry 16 may be configured to compare the verification image data to a predetermined data set stored on image processing circuitry 16. Following the comparison, image processing circuitry 16 may send status information or other verification information to host subsystem 20.

Figure 2:
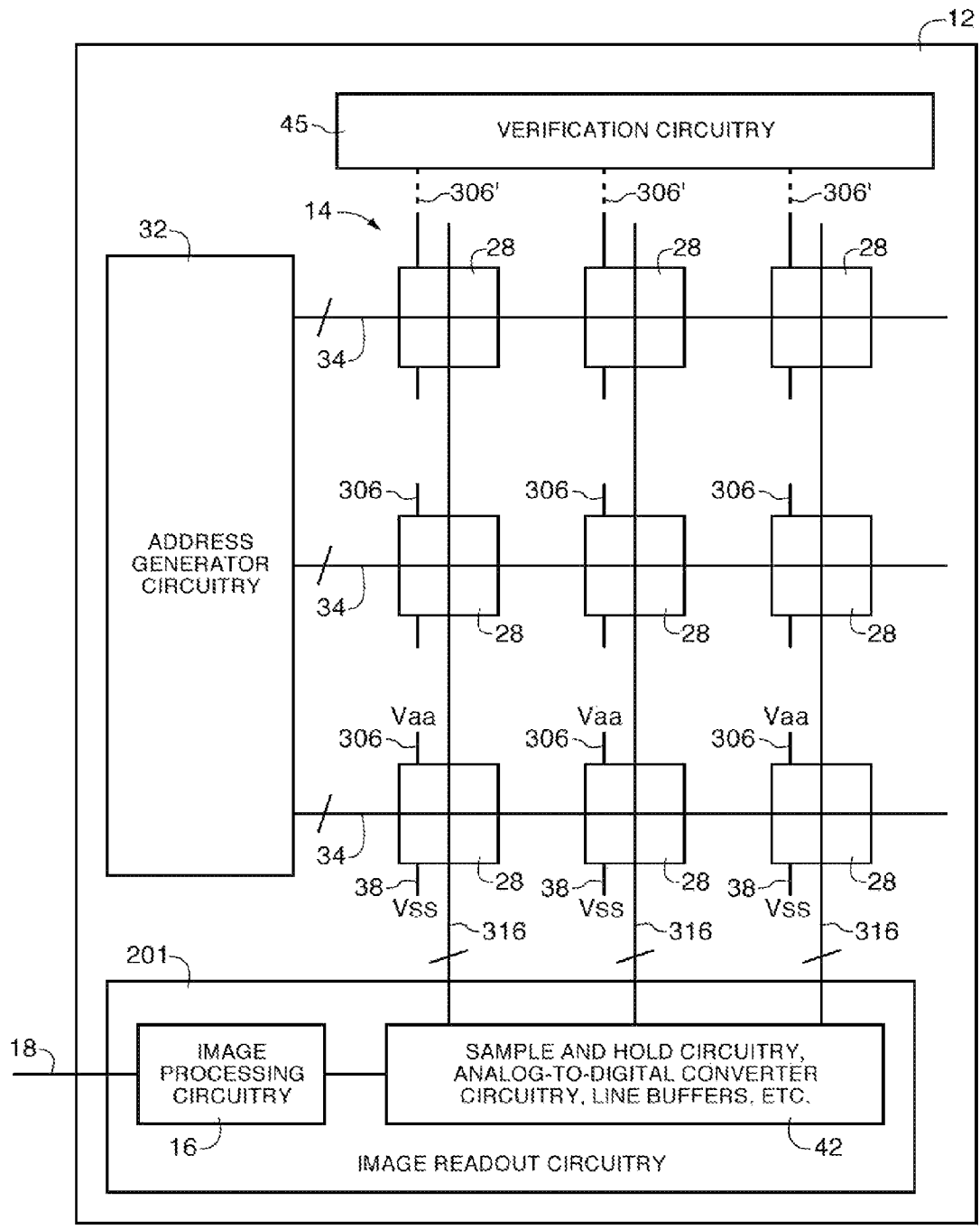
FIG. 2 is a diagram of an illustrative array of image pixels and control circuitry coupled to the array of image pixels in accordance with an embodiment of the present invention.

An example of an arrangement for camera module 12 is shown in FIG. 2. As shown in FIG. 2, camera module 12 includes an array 14 of pixels 28 coupled to image readout circuitry 201 and address generator circuitry 32. As an example, each of the pixels in a row of array 14 may be coupled to address generator circuitry 32 by one or more conductive lines 34. If desired, pixels 28 may also be coupled to bias voltage supply lines 306 and ground voltage supply ($V_{SS}$) lines 38.

Array 14 may have any number of rows and columns. In general, the size of array 14 and the number of rows and columns in array 14 will depend on the particular implementation. While rows and columns are generally described herein as being horizontal and vertical, respectively, rows and columns may refer to any grid-like structure (e.g., features described herein as rows may be arranged vertically and features described herein as columns may be arranged horizontally).

Array 14 may be provided with dark pixels that are used to remove dark current from image data and/or to test the integrity of the imaging system. Dark pixels in array 14 may be optically shielded so that they are prevented from receiving incoming light. Verification circuitry associated with array 14 such as verification circuitry 45 may provide some or all dark pixels in a pixel array with verification image data that passes through the same pixel-to-output data path as image data from pixels that receive image light (light-sensitive) pixels in array 14. In some arrangements, verification circuitry 45 may be coupled to pixels 28 via bias voltage supply lines 306 (as shown by dashed lines 306'). In other arrangements, bias voltage supply lines 306 may couple pixels 28 with other circuitry in camera module 12. The verification image data from dark pixels may be compared with a predetermined data set to verify that image sensor 14 is functioning properly. If desired, dark pixels may be formed on the edge of array 14 (e.g., on one side, on two sides, on three sides, or on all four sides of an array of light-receiving pixels), or may be interspersed between light-receiving pixels in array 14.

Address generator circuitry 32 may generate signals on paths 34 as desired. For example, address generator circuitry 32 may generate reset signals on reset lines in paths 34, transfer signals on transfer lines in paths 34, and row select (e.g., row readout) signals on row select lines in paths 34 to control the operation of array 14. If desired, address generator circuitry 32 and array 14 may be integrated together in a single integrated circuit (as an example).

Image readout circuitry 201 may include circuitry 42 and image processing and data formatting circuitry 16. Circuitry 42 may include sample and hold circuitry, analog-to-digital converter circuitry, and line buffer circuitry (as examples). As one example, circuitry 42 may be used to measure signals in pixels 28 and may be used to buffer the signals while analog-to-digital converters in circuitry 42 convert the signals to digital signals. In a typical arrangement, circuitry 42 reads signals from rows of pixels 28 one row at a time over lines 316. The digital signals read out by circuitry 42 may be representative of charges accumulated by pixels 28 in response to incident light. The digital signals produced by the analog-to-digital converters of circuitry 42 may be conveyed to image processing and data formatting circuitry 16 and then to host subsystem 20 (FIG. 1) over path 18.

Figure 3:
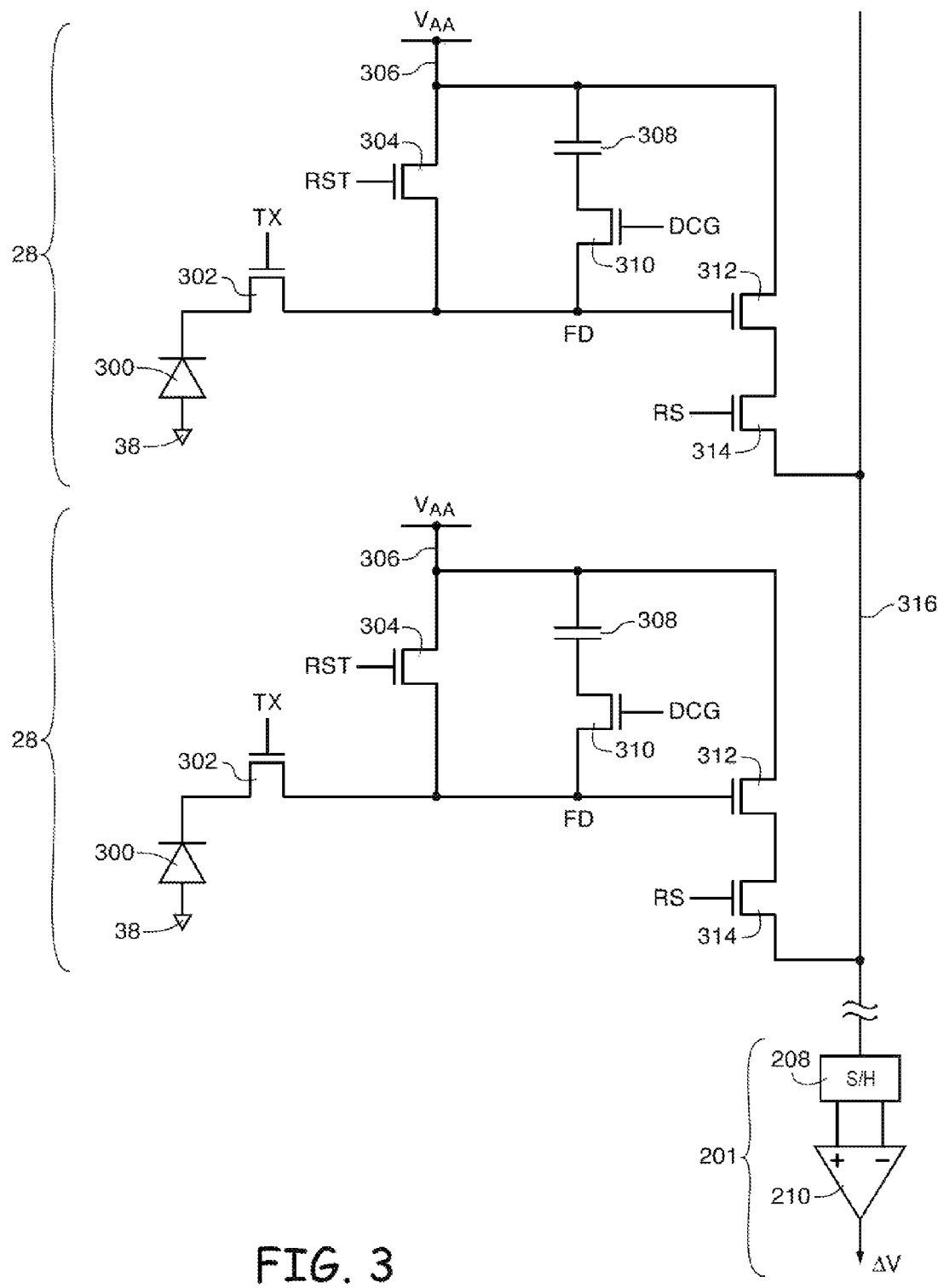
FIG. 3 is a diagram of illustrative light-receiving image pixels in accordance with an embodiment of the present invention.

One suitable circuit implementation of light-receiving (light-sensitive) pixels 28 is shown in FIG. 3. As illustrated in FIG. 3, each column of pixels may be coupled to associated column readout circuitry 201. Column readout circuitry 201 may, if desired, include sample/hold circuit 208 and column amplifier 210.

Each pixel 28 may include photosensitive element 300 (e.g., a photodiode or other light gathering element) coupled to a floating diffusion node FD through transfer gate 302. Transfer gate 302 may have a gate terminal that is controlled by signal TX. Reset transistor 304 may be coupled between bias voltage supply line 306 (e.g., a positive power supply line on which positive power supply voltage $V_{AA}$ is provided) and floating diffusion node FD. Reset transistor 304 may have a gate terminal that is controlled using signal RST.

Source follower transistor 312 and row select (read) transistor 314 may be coupled in series between bias voltage line 306 and column output line 316. Source follower transistor 312 may have a gate terminal that is coupled to node FD, whereas read transistor 314 may have a gate terminal that is controlled using row select signal RS. Pixels 28 located along the same row may receive a common row select signal RS, whereas pixels 28 located along the same column may be coupled to separate respective row select lines. Only a selected one of row select transistors 314 is turned on in any given column during read operations.

Pixels 28 may be provided with gain selection circuitry that enhances the dynamic range of the images produced by image sensor 14. For example, each pixel may generate a corresponding output value using a selected gain setting. In some configurations, a selected gain setting may depend on the amount of light captured by the pixel during an exposure (i.e., an integration period between resets of the pixel during which a photosensitive element generates charges in response to incoming light). In other configurations, the gain may be kept at a constant setting. As shown in FIG. 3, image pixel 28 may include capacitor 308 and transistor 310 coupled in series between positive power supply line 306 and floating diffusion node FD. Transistor 310 may have a gate terminal that is controlled using dual conversion gain signal DCG. Pixel 28 may be operable in first and second modes (e.g., in a high conversion gain mode and in a low conversion gain mode). If transistor 310 is disabled (e.g., if signal DCG is low), pixel 28 is placed in the high conversion gain mode. If transistor 310 is enabled (e.g., if signal DCG is high), pixel 28 is placed in the low conversion gain mode.

In general, pixel conversion gain is inversely proportional to the amount of loading capacitance at node FD. When transistor 310 is turned on, capacitor 308 is switched into use in order to provide floating diffusion node FD with additional capacitance. This results in a lower conversion gain for pixel 28. When transistor 310 is turned off, the additional loading of capacitor 308 is removed and pixel 28 reverts to a relatively higher pixel conversion gain configuration.

Column output line 316 may be coupled to sample/hold circuit 208. Following a reset operation (e.g., in response to pulsing RST), circuit 208 may be used to sample a corresponding reset signal $V_{RST}$ from the selected image pixel and to hold $V_{RST}$ at its first output terminal. Following a charge transfer operation (e.g., in response to pulsing TX), circuit 208 may be used to sample a corresponding image signal $V_{SIG}$ from the selected pixel and to hold $V_{SIG}$ at its second output terminal.

Column amplifier 210 may include first and second inputs. The first (positive) input of amplifier 210 may be coupled to the first output terminal of circuit 208, whereas the second (negative) input of amplifier 210 may be coupled to the second output terminal of circuit 208. Column amplifier 210 may be used to generate at its output a signal that is proportional to difference $\Delta V$ between reset signal $V_{RST}$ (received at its first input) and image signal $V_{SIG}$ (received at its second input). The differential signal $\Delta V$ generated by column amplifier 210 may then be provided to image processing circuitry 16 (FIG. 2).

If desired, other types of image pixel circuitry may be used to implement the image pixels of sensor 14. For example, image sensor pixel 28 may be a three-transistor pixel, a pin-photodiode pixel with four transistors, a global shutter pixel, a time-of-flight pixel, etc. The circuitry of FIG. 3 is merely illustrative.

Dark pixels in array 14 may be used to generate verification image data for imaging system 100. A pattern or sequence of verification image data values may be encoded into dark pixels in array 14. Verification image data from dark pixels may follow the same pixel-to-output data path as image data from light-receiving pixels. Verification image data may be provided to image processing circuitry 16 and/or storage and processing circuitry 24. Image processing circuitry 16 may be configured to compare the verification image data to a predetermined data set stored on image processing circuitry 16. Following the comparison, image processing circuitry 16 may send status information or other verification information to host subsystem 20.

Figure 4:
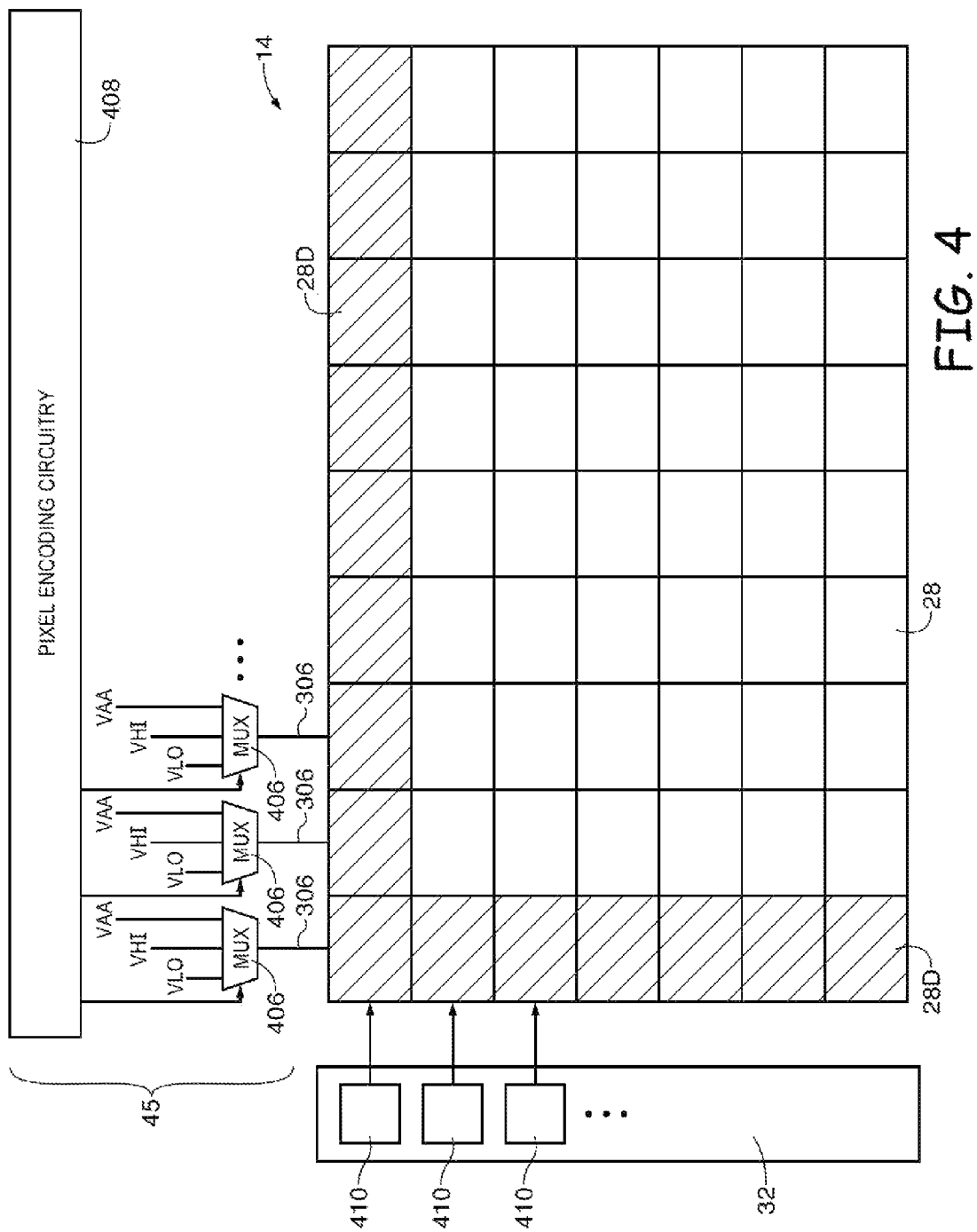
FIG. 4 is a diagram of an illustrative image pixel array having dark pixels that may be provided with encoded verification image data such as an encoded current frame number in accordance with an embodiment of the present invention.

FIG. 4 is an illustrative example of how verification circuitry 45 may be configured to encode verification image data into selected pixels 28. As shown in FIG. 4, each column of pixels 28 may be coupled to an associated multiplexer such as multiplexer 406 ("MUX"). Multiplexer 406 may be configured to route a selected one of multiple input signals to its output terminal. In the example of FIG. 4, multiplexer 406 has three inputs corresponding to voltages $V_{LO}$, $V_{HI}$, and $V_{AA}$. A selected one of these inputs may be routed to one or more associated pixels via bias voltage supply line 306.

The output of each multiplexer 406 may be controlled by circuitry such as pixel encoding circuitry 408. Pixel encoding circuitry 408 may include circuitry for encoding a pattern or sequence of verification image data values into dark pixels such as dark pixels 28D of array 14. For example, pixel encoding circuitry 408 may include a frame counter and may be configured to digitally encode a current frame number or other digital pattern into dark pixels 28D. The frame number may, for example, be represented by a sequence of binary digits (bits). Each bit in the sequence may be encoded into a selected dark pixel 28D by writing either $V_{LO}$ (corresponding to a logic '0') or $V_{HI}$ (corresponding to a logic '1') into the photodiode of that pixel. As the frame number changes from frame-to-frame, the bit values in the frame count sequence of bits will also change from frame-to-frame. If desired, more than one pixel may be allocated the same bit value. For example, a pixel-region may contain two or more pixels that are allocated the same bit value. The readout signals from the pixels in that pixel-region may be averaged to filter out noise.

Pixel encoding circuitry 408 may also include error-detection circuitry such as a cyclic redundancy check (CRC) generator to detect corruption in the frame count sequence of bits. The CRC generator may generate a CRC sequence of bits that corresponds with the current frame count. The frame count sequence of bits and the CRC sequence of bits may both be encoded into selected dark pixels 28D. For example, a 32-bit frame count sequence with an 8-bit CRC sequence would result in a 40-bit sequence of verification image data values. In this example, 40 dark pixels (or 40 pixel-regions of two or more dark pixels each) would be used to encode the 40-bit sequence of verification image data values. In general, any suitable number of bits may be used to encode verification image data into pixels 28D.

Each row of pixels may be provided with pixel control circuitry such as pixel control circuitry 410. Pixel control circuitry 410 may be configured to operate pixels in a row of pixels during a bit write phase in which bits are written into pixels 28D.

Figure 5:
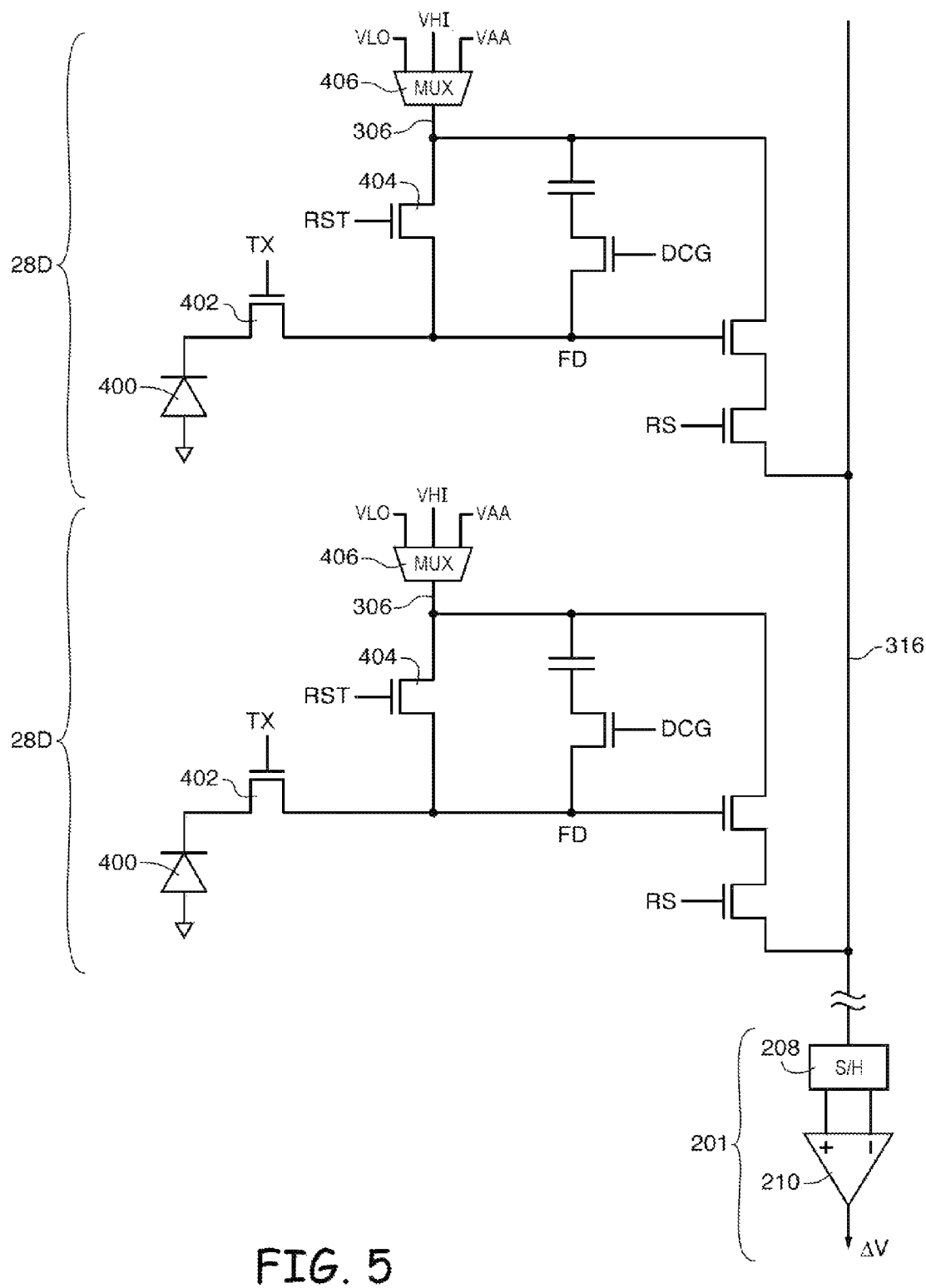
FIG. 5 is a diagram of illustrative image pixels that may be provided with encoded verification image data such as an encoded current frame number in accordance with an embodiment of the present invention.

FIG. 5 is an illustrative example of circuitry that may be used to write a programmable voltage (e.g., a bit one or bit zero value) into the photodiode of a selected dark pixel 28D. As shown in FIG. 5, multiplexer 406 may route a selected one of voltages $V_{HI}$, $V_{LO}$, or $V_{AA}$ to power supply line 306. Voltages $V_{HI}$ and $V_{LO}$ may be used during the bit write phase, whereas voltage $V_{AA}$ may be used to reset the floating diffusion node FD prior to integration.

The bit write phase in which the programmable voltage is written into photodiode 400 may occur during a reset operation. Similar to a normal reset operation, the bit write phase may be initiated by pulsing signal RST. Multiplexer 406 may route either $V_{HI}$ or $V_{LO}$ to power supply line 306. Pixel control circuitry 410 may be configured to turn on transfer transistor 402 when reset transistor 404 is turned on during the bit write phase. This ensures that the programmable voltage (either $V_{HI}$ or $V_{LO}$) from power supply line 306 is forced onto photodiode 400.

Following the bit write phase, transfer transistor 402 may be turned off so that normal reset operations may resume. Keeping reset transistor 404 turned on, multiplexer 406 may route voltage $V_{AA}$ to its output, thereby resetting floating diffusion region FD to $V_{AA}$. Sample/hold circuit 208 may be used to sample the corresponding reset signal $V_{RST}$ from the selected image pixel and to hold $V_{RST}$ at its first output terminal. Following an integration period in which light-receiving pixels 28 integrate charge in response to incoming light and following a subsequent charge transfer operation (e.g., in response to pulsing TX), circuit 208 may be used to sample a corresponding image signal $V_{SIG}$ from the selected pixel and to hold $V_{SIG}$ at its second output terminal. Column amplifier 210 may then be used to generate at its output a signal that is proportional to the difference $\Delta V$ between signal $V_{RST}$ received at its first input and signal $V_{SIG}$ received at its second input. The differential signal $\Delta V$ generated by column amplifier 210 may then be provided to image processing circuitry 16 (FIG. 2).

Because dark pixels 28D are prevented from receiving incoming light, the photodiodes of dark pixels 28D will not have accumulated any additional charge during the integration period. The image signal $V_{SIG}$ of a dark pixel 28D that has been provided with verification image data will therefore be substantially the same as the programmable voltage that was written into the photodiode prior to the integration period (e.g., the image signal $V_{SIG}$ of that dark pixel will be equal to or nearly equal to $V_{HI}$ or $V_{LO}$).

Verification image data (e.g., the digitally encoded frame count or other digitally encoded data) from dark pixels 28D will follow the same pixel-to-output data path as image data from light-receiving pixels 28 in array 14. In some configurations, image processing circuitry 16 of camera module 12 may be used to decode the verification image data and compare it with a known data set (e.g., a known or expected frame number or other predetermined data set). In other configurations, host subsystem 20 may be used to compare the verification image data with a known data set. If the verification image data does not match the current frame number, host subsystem 20 may be configured to disable some or all of imaging system 10 and, if desired, issue a warning to the operator of system 100 (e.g., issue a warning to the driver of an automobile that uses system 100).

Figure 6:
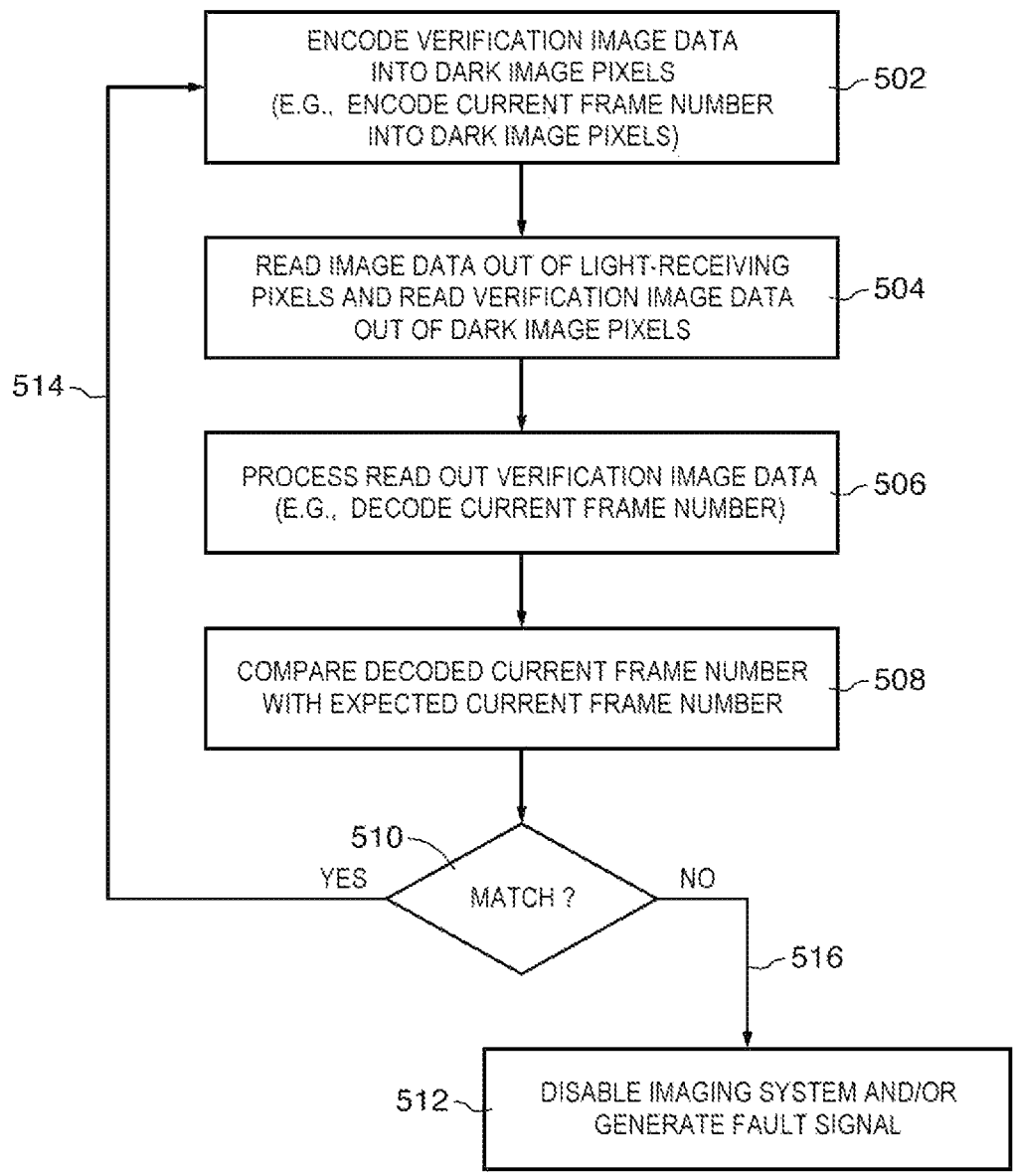
FIG. 6 is a flowchart of illustrative steps that may be used for continuous on-the fly verification of imaging systems such as verification of a current frame number in accordance with an embodiment of the present invention.

FIG. 6 is a flowchart showing illustrative steps that may be used in operating a system that includes an image sensor with self-verification capabilities such as image sensor 14 of FIG. 4

At step 502, circuitry such as pixel encoding circuitry 408 may be used to encode verification image data into dark image pixels 28D. Verification image data may include an encoded current frame number or other digitally encoded data. The verification image data may also include a CRC code that is used to detect corruption in the encoded current frame number. The verification image data may be encoded into dark image pixels 28D by writing bit one and zero values into the photodiodes 400 of dark pixels 28D.

At step 504, image readout circuitry such as image readout circuitry 201 of FIG. 2 may be used to read verification image data out of dark pixels 28D. Image data from light-receiving pixels 28 may also be read out and provided to host subsystems 20.

At step 505, the read out verification image data may then be processed by image processing circuitry 16. Processing of verification image data by image processing circuitry 16 may include decoding the current frame number from the verification image data.

An expected current frame number may be stored or generated in image processing circuitry 16. At step 508, image processing circuitry 16 may be used to compare the decoded current frame number with the expected current frame number.

At step 510, image processing circuitry 16 may be used to determine if the decoded current frame number matches the expected current frame number.

If it is determined that the decoded current frame number matches the expected current frame number, system 100 may return to step 502 (as indicated by line 514) and resume the cycle of image capture and imaging system verification while system 100 continues to operate. If the decoded current frame number does not match the expected current frame number, system 100 may progress to step 512.

At optional step 512, host subsystem 20 may disable some or all of imaging system 10 and, if desired, generate a fault signal such as an audible or visible failure alert signal for an operator of system 100 (e.g., an operator of a vehicle including a vehicle safety system such as system 100 may receive an alert signal). In some arrangements, imaging system 10 may remain in operation but an indicator may be presented to the operator to inform the operator that the imaging system needs further inspection and/or repair (e.g., the imaging system may present a "check imaging system" indication when the results of verification operations indicate a potential problem in the operation of the imaging system).

Figure 7:
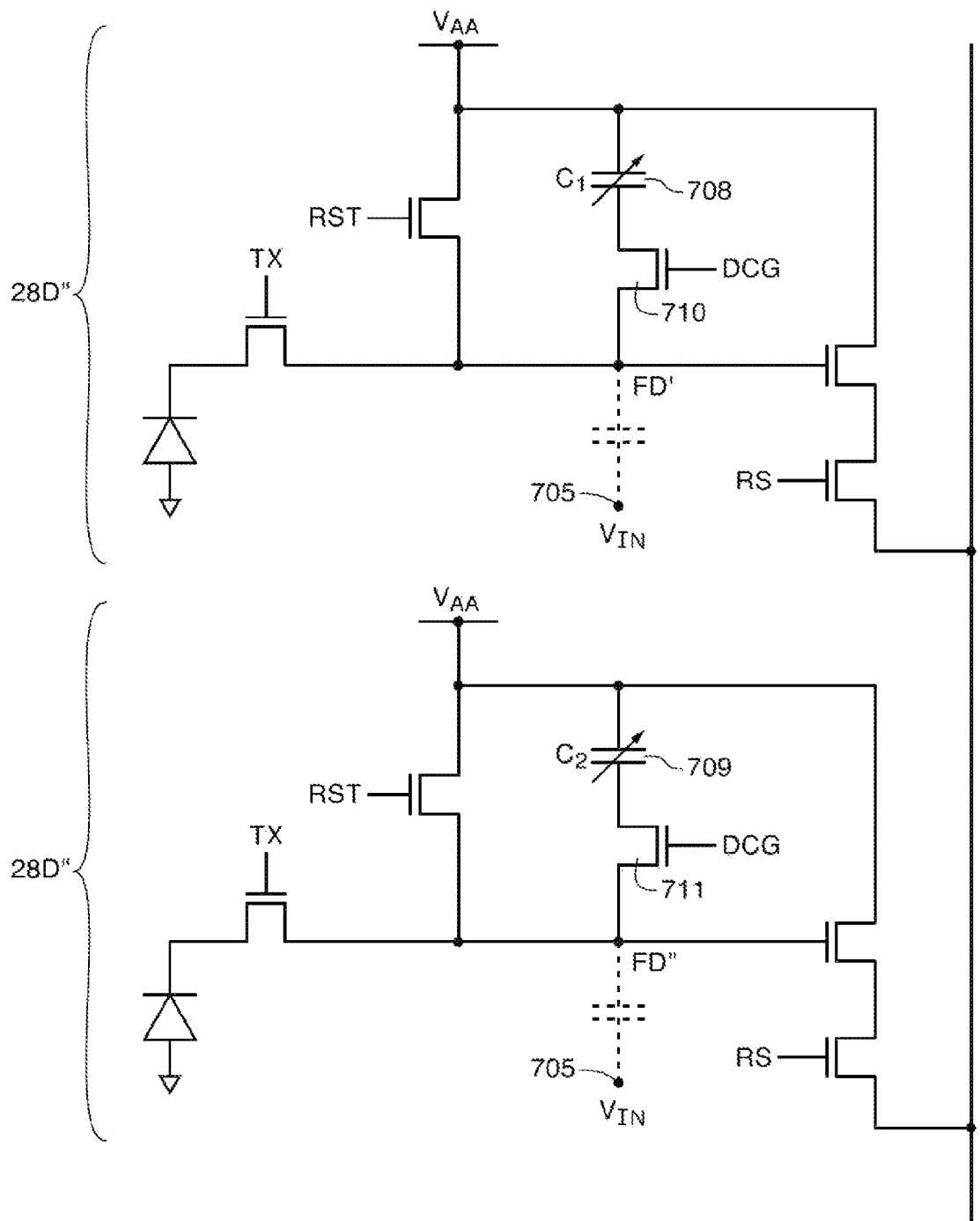
FIG. 7 is a diagram of illustrative image pixels that may be provided with encoded verification image data using patterned predetermined conversion gains in accordance with an embodiment of the present invention.

FIG. 7 is an illustrative example of another configuration of verification circuitry for encoding verification image data into optically shielded dark image pixels in an image sensor such as image sensor 14. In the example of FIG. 7, the conversion gain of each dark pixel may vary from pixel-to-pixel. A small test signal (e.g., a pedestal voltage between $V_{AA}$ and a ground voltage) may be injected into the floating diffusion node of each dark pixel. By varying the conversion gain of dark pixels in a known or predetermined pattern, the output signals (associated with the test signal) from the dark pixels may be compared against expected output signals to determine if the image sensor is functioning properly.

As shown in FIG. 7, dark pixels such as dark pixels 28D' and 28D" may each have respective floating diffusion regions FD' and FD". During a reset operation, a test signal $V_{IN}$ may be injected into the floating diffusion nodes of dark pixels such as dark pixels 28D' and 28D". If desired, test signal V may be injected via capacitive coupling to a nearby associated signal node such as signal node 705 (e.g., a $V_{AA}$ signal node, an RS signal node, or other suitable nearby signal node). Test signal $V_{IN}$ may also be injected via a dedicated signal line that has been routed to the pixel. The test signal may be a small offset signal that will not saturate pixels 28.

A common test signal may be used for some or all of the dark pixels in array 14. To vary the output of each dark pixel given a common input test signal, the conversion gain of each dark pixel may be different from the conversion gains of other dark pixels. Because the dark pixels are optically shielded, the output signal of each individual dark pixel will be based on the common injected test signal and the conversion gain of that particular dark pixel. However, this is merely illustrative. If desired, a patterned injected test signal may be provided to dark pixels having individually configured conversion gains in order to provide verification image data having, for example, a frame number and a signal gradient encoded into dark pixels such as border pixels of a pixel array.

In the example of FIG. 7, the conversion gain circuitry of pixel 28D' comprises capacitor 708 and DCG switch 710. The conversion gain of pixel 28D' may be dictated by capacitance $C_1$ of capacitor 708 and by the state of DCG switch 710 (e.g., switch 710 may be turned on or off, thereby respectively enabling or disabling the use of capacitor 710 as additional floating diffusion capacitance). Similarly, the conversion gain of pixel 28D" comprises capacitor 709 and DCG switch 711. The conversion gain of pixel 28D" may be dictated by capacitance $C_2$ of capacitor 709 and by the state of DCG switch 711.

In one embodiment, pixels 28D' and 28D" may be given different conversion gains by configuring capacitors 708 and 709 to have different capacitances. Capacitors 708 and 709 may be variable capacitors that are operable to providing controllable capacitances, or capacitors 708 and 709 may be physically formed to have permanent known capacitance differences (e.g., capacitor 708 may have a different physical size than capacitor 709). This, however, is merely illustrative. Other properties of capacitors 708 and 709 may be altered or adjusted to yield different capacitances $C_1$ and $C_2$. During verification operations, DCG switches 710 and 711 may be kept on so that the difference in conversion gain between pixel 28D' and pixel 28D" is constant and is based on the difference in capacitances $C_1$ and $C_2$.

In another embodiment, the capacitances $C_1$ and $C_2$ may be equal, and the conversion gain of dark pixels such as dark pixels 28D' and 28D" may be varied by turning one DCG switch on (e.g., turning switch 710 on, thereby enabling the use of capacitor 708 as additional floating diffusion capacitance) and by turning one DCG switch off (e.g., turning switch 711 off, thereby disabling the use of capacitor 709 as additional floating diffusion capacitance). In this particular example, the conversion gain of pixel 28D" would be greater than the conversion gain of pixel 28D'. If desired, conversion gain may be varied from pixel-to-pixel by using a combination of different size capacitors and by selectively enabling and disabling use of the capacitors. In general, any suitable method of adjusting the conversion gain of pixels may be used to create any suitable pattern of conversion gain settings.

If desired, a current frame number or other digital sequence of values may be encoded into dark pixels 28D by selectively turning DCG switches on and off. The gate terminals of transistors 710 and 711 may be coupled to pixel encoding circuitry that has a frame counter. The pixel encoding circuitry may be configured to encode a current frame number into dark pixels 28D by selectively turning DCG switches (such as DCG switches 710 and 711) on and off. For example, a logic '1' may be encoded into pixel 28D' by turning switch 710 on, and a logic '0' may be encoded into pixel 28D" by turning switch 710 off. The current frame number encoded in the output signals from dark pixels 28D may be decoded by image processing circuitry 16 and compared with an expected current frame number.

By varying the conversion gain of each dark pixel in a predetermined or known pattern (e.g., by configuring the conversion gain of pixel 28D" to be greater or less than the conversion gain of pixel 28D' or by selectively turning switches 710 and 711 on and off), the output signals from the dark pixels may be compared with a predetermined set of expected output signals to determine if the imaging system is functioning properly.

Figure 8:
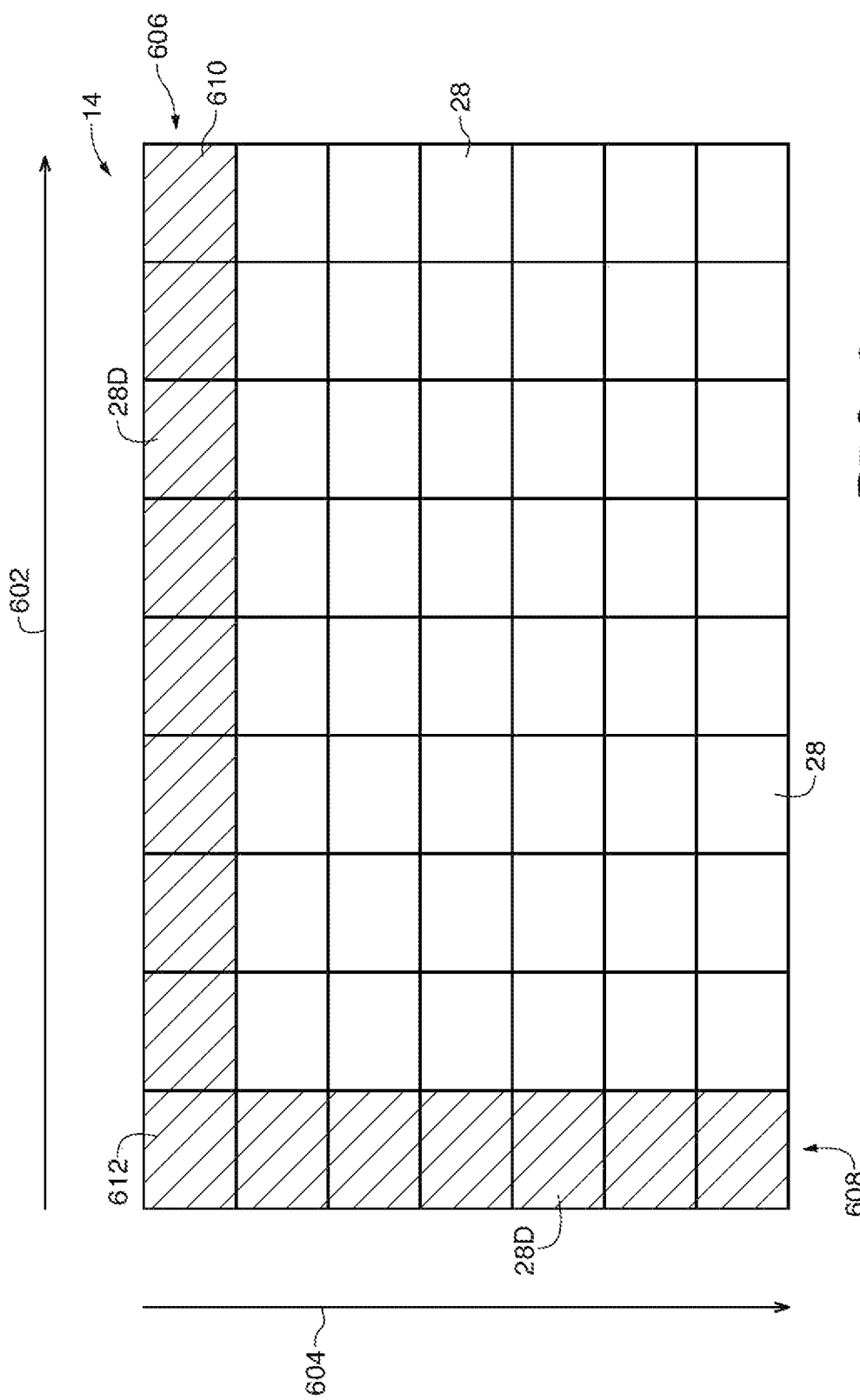
FIG. 8 is a diagram of an illustrative pixel array having dark pixels that may be provided with encoded verification image data using a predetermined pattern of conversion gain levels in accordance with an embodiment of the present invention.

For clarity, only two dark pixels are shown with different conversion gain settings. However, one dark pixel, two dark pixels, more than two dark pixels, or all of the dark pixels in an array may be provided with an individual predetermined conversion gain setting. As shown in FIG. 8, dark pixels 28D may form one or more rows of pixels in array 14 and may form one or more columns in array 14. The conversion gain of pixels 28D in a given row or column may increase or decrease from pixel-to-pixel. For example, the conversion gain of pixels 28D in row 606 may increase from pixel-to-pixel along direction 602. The resulting image would yield an intensity gradient along row 606. Similarly, the conversion gain of pixels 28D in column 608 may increase from pixel-to-pixel along the direction 604, resulting in an intensity gradient along column 608. This example is merely illustrative. In general, any pattern of conversion gain settings may be used to create a predictable pattern of intensity levels in the resulting image.

The resulting image may be compared with a "golden image" or other predetermined standard that has been stored in the imaging system or that has been stored in the host subsystem. If, for example, the conversion gain of pixels 28D in row 606 increased from pixel-to-pixel along the direction 602, the golden image would have a gradient intensity along row 606, with pixel 610 being the brightest and pixel 612 being the darkest. Images captured by imaging system 100 may be continuously or intermittently compared with the golden image or other predetermined set of expected output signals to determine if the imaging system is functioning properly.

Figure 9:
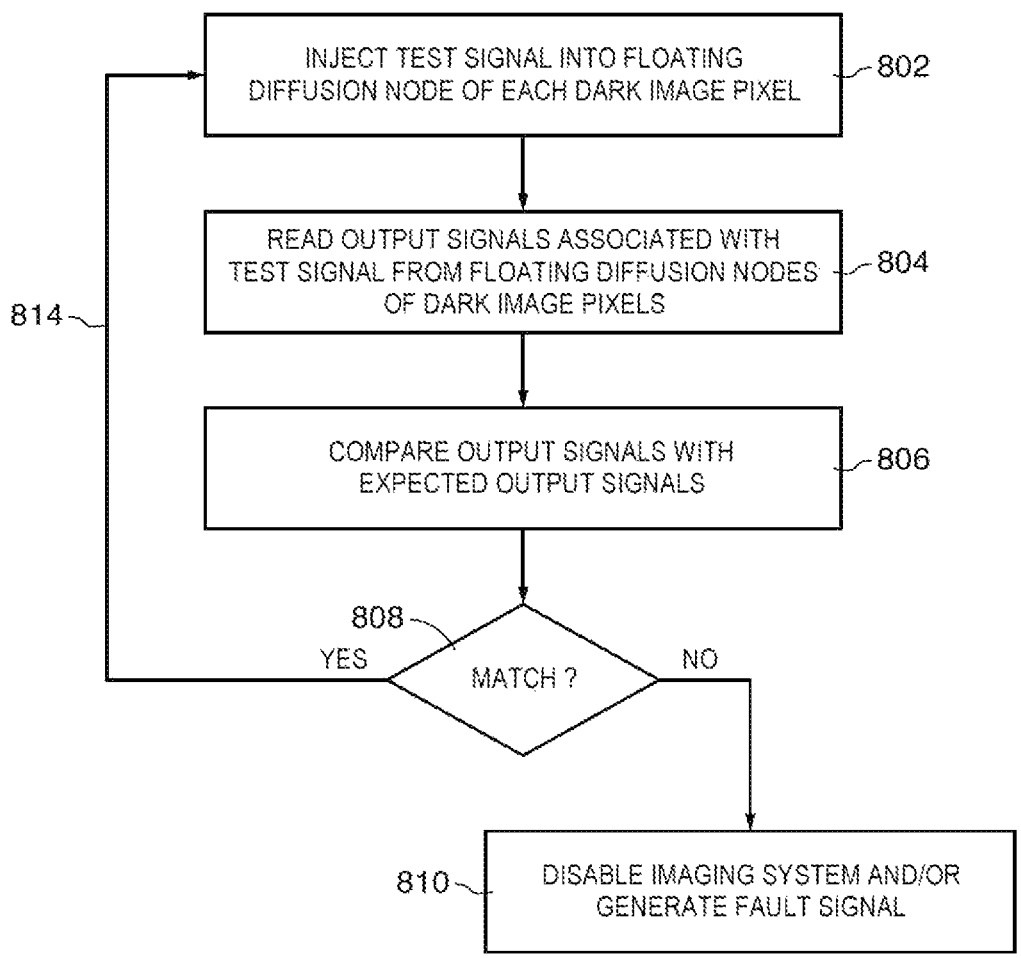
FIG. 9 is a flowchart of illustrative steps that may be used for continuous on-the-fly verification of imaging systems using dark pixels having a predetermined pattern of conversion gain levels in accordance with an embodiment of the present invention.

FIG. 9 is a flowchart showing illustrative steps that may be used in operating a system that includes an image sensor with self-verification capabilities such as image sensor 14 of FIG. 8.

At step 802, test signal may $V_{IN}$ may be injected into the floating diffusion nodes of dark pixels 28D. Test signal injection may occur during a normal reset operation of pixel 28.

At step 804, readout circuitry 201 may be used to read output signals associated with test signal $V_{IN}$ from the floating diffusion nodes of dark pixels 28D. The output signal of any given dark pixel will be determined by the conversion gain of that pixel.

At step 806, image processing circuitry 16 may receive the output signals and may be used to compare the output signals with a golden image or other predetermined set of expected output signals.

At step 808 image processing circuitry 16 may be used to determine if there is a match between the output signals and the expected output signals.

If it is determined that the output signals match the expected output signals, system 100 may return to step 802 (as indicated by line 814) and resume the cycle of image capture and imaging system verification while system 100 continues to operate. If the output signals do not match the expected output signals, system 100 may progress to step 810.

At optional step 810, host subsystem 20 may disable some or all of imaging system 10 and, if desired, generate a fault signal such as an audible or visible failure alert signal for an operator of system 100 (e.g., an operator of a vehicle including a vehicle safety system such as system 100 may receive an alert signal). In some arrangements, imaging system 10 may remain in operation but an indicator may be presented to the operator to inform the operator that the imaging system needs further inspection and/or repair (e.g., the imaging system may present a "check imaging system" indication when the results of verification operations indicate a potential problem in the operation of the imaging system).

Various embodiments have been described illustrating an imaging and response system (see, e.g., system 100 of FIG. 1) including an imaging system and host subsystems. An imaging system may include one or more image sensors. Each image sensor may include an array of image pixels formed on a semiconductor substrate. Each image pixel may include one or more photosensitive elements configured to convert incoming light into electric charges.

Each image sensor may include a plurality of optically shield dark image pixels. Dark image pixels may be located at or near the edge of the pixel array. Dark image pixels may be used to generate verification image data that follows the same pixel-to-output data path as image data from light-receiving pixels. The verification image data may be compared against a known or predetermined data set to verify that the imaging system is functioning properly.

According to one example, verification image data may include a current frame number. Pixel encoding circuitry may be used to encode the current frame number into a sequence of bit one and zero values. The pixel encoding circuitry may include a cyclic redundancy check generator that is used to detect corruption in the encoded frame number. The CRC generator may generate a sequence of bit one and zero values corresponding to the current frame number and may be encoded along with the frame number sequence of bit values. The current frame number and CRC code may be encoded into dark pixels in the array by writing each bit value onto the photodiode of a respective dark pixel in the array. Pixel-regions of two or more pixels may be assigned the same bit value to enable noise filtering.

A multiplexer may be coupled between the pixel encoding circuitry and an associated column of pixels. The multiplexer may be configured to route a selected one of voltages $V_{HI}$, $V_{LO}$, and $V_{AA}$ to its output terminal. Voltages $V_{HI}$ and $V_{LO}$ (corresponding respectively to logic '1' and logic '0') may be used during bit write phase, and $V_{AA}$ may be used to reset the floating diffusion node. Because dark pixels will not have accumulated any charge during the integration period, the output signal from a dark pixel will be representative of the programmable voltage that was written on to its photodiode prior to the integration period. Image processing circuitry may be used to decode the current frame number from the output signals and to determine of the decoded current frame number matches an expected current frame number. If the decoded current frame number matches the expected current frame number, the imaging system may continue to operate and self-verify. If the decoded current frame number does not match the expected current frame number, the imaging system may be disabled and/or a warning signal may be presented to the user of the system.

According to another example, verification image data may include a predetermined signal pattern generated by pixels having a predetermined pattern of conversion gain settings. For example, each dark pixel or pixel-region of dark pixels may be configured to have a particular conversion gain setting. The conversion gain of a particular pixel may be set to a predetermined setting using any suitable method. For example, capacitors that form part of the conversion gain circuitry in pixels may be formed from different sized capacitors. As another example, some dark pixels in the array may have portions of their respective conversion gain circuitry disabled, while other dark pixels in the array may have those portions of their respective conversion gain circuitry enabled.

A row or column of dark pixels may be provided with a range of conversion gain settings. For example, conversion gain may increase or decrease from pixel-to-pixel in a row or column of dark pixels. This will result in an intensity gradient in output signal values across that row or column. The resulting image or resulting output signals from the dark pixels may be compared against a golden image or other predetermined set of expected output signals to determine if the imaging system is function properly. If the output signals match the expected output signals, the imaging system may continue to operate and self-verify. If the output signals do not match the expected output signals, the imaging system may be disabled and/or a warning signal may be presented to the user of the system.

The foregoing is merely illustrative of the principles of this invention which can be practiced in other embodiments.

What is claimed is:

1. An image sensor, comprising:
    an array of image pixels having a plurality of light-receiving image pixels and a plurality of dark image pixels that are optically shielded, wherein each dark image pixel has floating diffusion node with a floating diffusion capacitance that receives a test signal via capacitive coupling to an associated signal node, wherein the floating diffusion capacitance of each dark image pixel is set to a predetermined level, and wherein the predetermined level of floating diffusion capacitance of a first dark image pixel is different than the predetermined level of floating diffusion capacitance of a second dark image pixel.

2. The image sensor defined in claim 1 wherein each dark image pixel includes adjustable conversion gain circuitry, wherein the adjustable conversion gain circuitry includes a capacitor, and wherein the capacitor of the first dark image pixel has a different capacitance than the capacitor of the second dark image pixel.

3. The image sensor defined in claim 2 wherein the plurality of dark image pixels form a block of dark image pixels, wherein the block comprises a block selected from the group consisting of: a row and a column, and wherein the capacitances of the capacitors increase incrementally from one end of the block of dark image pixels to another end of the block of dark image pixels.

4. The image sensor defined in claim 1 wherein each dark image pixel includes adjustable conversion gain circuitry, wherein each dark image pixel is operable in one of a first conversion gain mode and a second conversion gain mode, wherein the first dark image pixel is set to operate in the first conversion gain mode, and wherein the second dark image pixel is set to operate in the second conversion gain mode.

5. The image sensor defined in claim 4 wherein the first dark image pixel is one of a first plurality of dark image pixels that are set to operate in the first conversion gain mode, wherein the second dark image pixel is one of a second plurality of dark image pixels that are set to operate in the second conversion gain mode, wherein the first conversion gain mode represents a bit one value, wherein the second conversion gain mode represents a bit zero value, and wherein the first and second pluralities of dark image pixels are together operable to encode a current frame number within the bit one and zero values.

6. A method of operating an imaging system having an image sensor that includes image readout circuitry and first and second optically shielded dark image pixels, wherein the first and second optically shielded dark image pixels have respective first and second floating diffusion capacitances and wherein the first and second floating diffusion capacitances are different, the method comprising:
    injecting a test signal into a floating diffusion node of the first optically shielded dark image pixel via capacitive coupling to a first associated signal node;
    injecting the test signal into a floating diffusion node of the second optically shielded dark image pixel via capacitive coupling to a second associated signal node; and
    with the image readout circuitry, reading first and second output signals associated with the test signal from the respective floating diffusion nodes of the first and second optically shielded dark image pixels.

7. The method of claim 6 further comprising:
    with the image processing circuitry, receiving the first and second output signals; and
    with the image processing circuitry, comparing the first and second output signals with expected output signals.

8. The method of claim 7 further comprising:
    with the image processing circuitry, providing a result of the comparison of the first and second output signals with the expected output signals to external circuitry.

9. A method of operating an imaging system having image processing circuitry and an image sensor that includes pixel encoding circuitry, image readout circuitry, and a plurality of optically shielded image pixels, comprising:
    with the pixel encoding circuitry, encoding verification image data into the plurality of optically shielded image pixels, wherein encoding the verification image data into the plurality of optically shielded image pixels comprises injecting test signals into the plurality of optically shielded image pixels and encoding a current frame number into the plurality of optically shielded image pixels.

10. The method defined in claim 9 further comprising:
    with the image readout circuitry, reading the verification image data out of the plurality of optically shielded image pixels.

11. The method defined in claim 10 further comprising:
    with the image processing circuitry, receiving and processing the read out verification image data, wherein processing the read out verification image data comprises decoding the current frame number.

12. The method defined in claim 11 further comprising:
with the image processing circuitry, comparing the decoded current frame number with an expected current frame number.

13. The method defined in claim 12, further comprising:
with the image processing circuitry, providing a result of the comparison of the decoded current frame number with the expected current frame number to external circuitry.

14. The method defined in claim 9 wherein injecting the test signals into the plurality of optically shielded pixels comprises injecting a range of voltages into the plurality of optically shielded pixels.

15. The method defined in claim 14 wherein the range of voltages corresponds to the current frame number.

16. The method defined in claim 9 wherein each optically shielded image pixel includes a floating diffusion node and wherein injecting the test signals into the plurality of optically shielded image pixels comprises injecting each test signal into an associated floating diffusion node.

17. The method defined in claim 16 wherein injecting each test signal into the associated floating diffusion node comprises injecting each test signal into the associated floating diffusion node via capacitive coupling.

* * * * *